United States Patent
Skrainar et al.

(10) Patent No.: US 9,774,749 B1
(45) Date of Patent: Sep. 26, 2017

(54) MULTIMODAL DYNAMIC POWER FEEDBACK MECHANISM FOR PRINT DEVICES

(71) Applicant: Xerox Corporation, Norwalk, CT (US)

(72) Inventors: Stephen F. Skrainar, Penfield, NY (US); Donald A. Brown, Honeoye Falls, NY (US); Andrew T. Martin, Honeoye Falls, NY (US); Brandon S. McComber, Webster, NY (US); Ken Hayward, Brockport, NY (US); Shane Jewitt, Webster, NY (US); Shinya Kogoh, Fujisawa (JP)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/186,671

(22) Filed: Jun. 20, 2016

(51) Int. Cl.
*H04N 1/00* (2006.01)

(52) U.S. Cl.
CPC ..... *H04N 1/00076* (2013.01); *H04N 1/00037* (2013.01); *H04N 1/00899* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,847,693 A * | 12/1998 | Shima | G05B 19/108 345/156 |
| 6,658,218 B2 | 12/2003 | Krolczyk et al. | |
| 7,782,224 B2 | 8/2010 | Marchetti | |
| 8,334,992 B2 * | 12/2012 | Kitamura | H04N 1/0049 358/1.14 |
| 2003/0011792 A1 | 1/2003 | Noyes et al. | |
| 2010/0091321 A1 | 4/2010 | LeVier et al. | |
| 2013/0053129 A1 * | 2/2013 | LeMay | G07F 17/3223 463/25 |
| 2014/0253953 A1 | 9/2014 | Oakley et al. | |
| 2014/0327927 A1 | 11/2014 | Lamontagne et al. | |
| 2016/0004496 A1 | 1/2016 | Liebelt et al. | |

* cited by examiner

*Primary Examiner* — Thomas D Lee
(74) *Attorney, Agent, or Firm* — Fox Rothschild LLP

(57) ABSTRACT

A multifunction device (MFD) includes a print engine, power status monitors, and a user interface. The user interface is at least partially surrounded by a perimeter, and a first light emitting module is positioned to illuminate at least part of the perimeter. The MFD also includes a processor in communication with the first light emitting module and a computer-readable medium containing programming instructions. An MFD may detect a triggering event corresponding to a change in its power status. In response to detecting the triggering event, the MFD may receive information relating to a current power status of the MFD from the power status monitors, identify a dynamic feedback pattern associated with the triggering event, and instruct the first light emitting module to emit a first visual pattern. The dynamic feedback pattern includes the first visual pattern that provides information about the current power status of the MFD to a user.

15 Claims, 6 Drawing Sheets

MULTIMODAL DYNAMIC POWER FEEDBACK MECHANISM FOR PRINT DEVICES

BACKGROUND

In the competitive consumer market for multifunction devices (MFDs) and other types of printing devices, it is of particular importance that a device be user-friendly. The ability of a device to provide customizable features and functions can drastically affect customer satisfaction. One aspect of a "user-friendly" print device is its effectiveness in communicating status and configuration information to the user.

Commercially available printing devices typically include one or more monochromatic indicator lights configured to visually indicate to the user the current power status of the printing device (i.e., ON, OFF, or IDLE). Printing devices may further include indicator lights (such as light emitting diodes) that are multi-color to enhance the indication function of the indicator light. However, the conventional indicator lights of a print device only convey binary information such as power is on or off, and do not provide any real-time status information when the print device is in a powering on or a powering off mode.

This document describes devices and methods that are intended to address issues discussed above and/or other issues.

SUMMARY

In an embodiment, a multifunction device may include a print engine, one or more power status monitors, and a user interface. The user interface may at least be partially surrounded by a perimeter, and a first light emitting module may be positioned to illuminate at least part of the perimeter. The multifunction device may also include a processor in communication with the first light emitting module, and a computer-readable medium containing one or more programming instructions. The multifunction device may detect a triggering event corresponding to a change in power status of a multifunction device, in response to detecting the triggering event, receive, from the one or more power status monitors, information relating to a current power status of the multifunction device, and identify a dynamic feedback pattern associated with the triggering event. The dynamic feedback pattern may include a first visual pattern that provides information about the current power status to a user. The multifunction device may instruct the first light emitting module to emit the first visual pattern.

In an embodiment, the first light emitting module may include a display comprising an LED, and a control unit. The control unit may be configured to receive the dynamic feedback pattern from the processor, and generate commands to cause the LED to create the first visual pattern.

In at least one embodiment, the multifunction device may also include an audio module. The multifunction device may identify the dynamic feedback pattern so that the dynamic feedback pattern also includes at least one audio pattern, and instruct the audio module to output the audio pattern as the first light emitting module emits the first visual pattern. In an embodiment, the audio pattern simulates the first visual pattern.

In some embodiments, the user interface may include a second light emitting module, and the identified dynamic feedback pattern also includes a second visual pattern that is emitted by the second light emitting module.

In an embodiment, the multifunction device may detect a triggering event corresponding to a change in power status upon occurrence of power on of the multifunction device, power off of the multifunction device, activation of a low power mode, impending activation of a low power mode within a threshold time period, or activation of warm-up of the multifunction device. The dynamic feedback pattern may include one or more distinct first visual patterns corresponding to a powering on sequence of the multifunction device, a powering off sequence of the multifunction device, a warm up sequence of the multifunction device, or a low power status of the multifunction device. In an embodiment, the triggering event may be the power on of the multifunction device, and the first visual pattern is a growing ring shape illumination pattern that provides information about the powering on sequence of the multifunction device. Alternatively and/or additionally, in certain embodiments, the multifunction device may receive power status of one or more components of the multifunction device, determine a time remaining until completion of the powering on sequence, and determine a size of the growing ring shape illumination pattern based on the determined time.

In an embodiment, the first visual pattern may include one or more of the following: LED color patterns, LED intensity variations, LED illumination patterns, LED illumination shapes, or LED illumination sizes. For example, the first visual pattern may include one or more of the following: a low-rate breathing illumination pattern, a high-rate breathing illumination pattern, a blinking illumination pattern, a solid illumination pattern, a growing bar shape illumination pattern, or a growing ring shape illumination pattern.

In an embodiment, the user interface of the multifunction device may be a power button and the perimeter may include a channel or a bezel.

In an embodiment, a method for providing a multimodal dynamic power feedback for a multifunction device may include detecting a triggering event corresponding to a change in power status of a multifunction device, in response to detecting the triggering event, receiving, from one or more power status monitors of the multifunction device, information relating to a current power status of the multifunction device, identifying a dynamic feedback pattern associated with the triggering event, and instructing a first light emitting module to emit a first visual pattern included in the dynamic feed pattern. The first visual pattern that provides information about the current power status to a user. The first light emitting module may be positioned to illuminate at least part of a perimeter that at least partially surrounds a user interface of the multifunction device.

DETAILED DESCRIPTION

Figure 1:
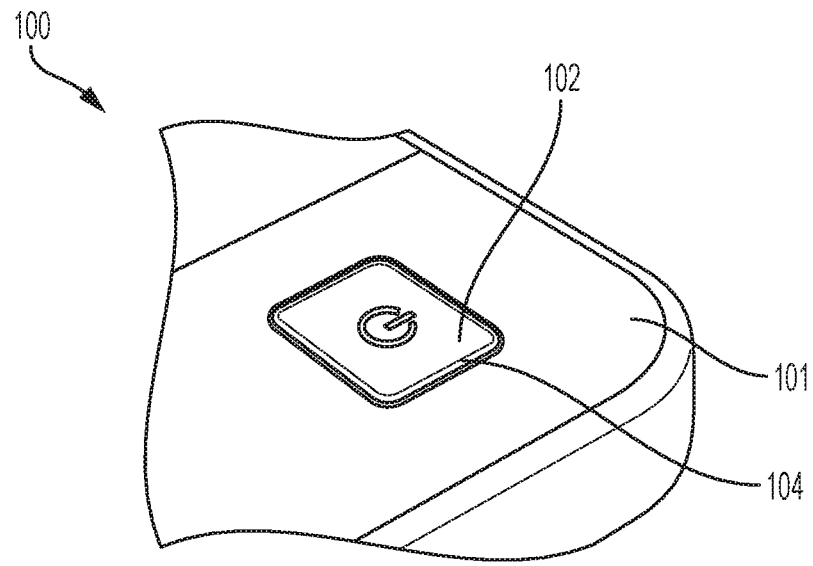
FIG. 1 illustrates an example system for conveying power related information using a multimodal dynamic power feedback mechanism, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

A "print device" refers to a device that includes a print engine for printing documents. The print device may also include a processor that can process the documents and a non-transitory memory device for storage of programming instructions, documents or portions of documents. Any suitable print device can be used including, but not limited to, inkjet and laser print devices, copiers, print devices, and the like. The print device may further include one or more sensors and/or monitors that collect information relating to a power status of the print device. Examples of such sensors and/or monitors may include, without limitation, actuators, end switches, toner sensors, paper tray sensors, paper sensors, shaft rotation sensors, position sensors, ink sensors, acceleration and/or velocity sensors, tension sensors, torsion sensors, heating/cooling sensors, voltage sensors, current sensors, connectivity detectors, light sensors, time sensors, print setting sensors, or any other similar device that may collect data from individual components of a print drive, and send signals or input about the power status of individual components to a processing device.

The term "multi-function device" (or "MFD") refers to a print device comprising hardware and associated software configured for enabling the device to print documents on substrates, as well as perform at least one other function on a document such as copying, facsimile transmitting or receiving, image scanning, emailing, or performing other actions on document-based data.

An "electronic device" refers to a device or system of devices that include a processor and a computer-readable medium. The memory may contain programming instructions in the form of a software application that, when executed by the processor, causes the device to perform one or more processing operations according to the programming instructions. An electronic device also may include additional components such as a touch-sensitive display device, microphone, keyboard or keypad or other components that serve as a user interface, as well as a camera or other imaging device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, digital cameras, tablet computing devices, aerial drones, personal computers, wearable electronic devices, a system, and the like.

The terms "computer-readable medium," "data storage facility," and "memory" each refer to a non-transitory device on which computer-readable data, programming instructions or both are stored. Unless the context specifically states that a single device is required or that multiple devices are required, the terms "computer-readable medium," "data storage facility," and "memory" include both the singular and plural embodiments, as well as portions of such devices such as memory sectors.

In this document, the terms "processor" and "processing device" refer to a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

The term "power status" of a print device refers to information relating to a state of operation of the print device at a given point of time such as the percentage of completion (and/or remaining percentage) of powering up or powering down of the print device, a warm-up period during powering on sequence or before a document processing job, time remaining until activation of a low power mode, or the like. Other power states like low power states (such as idle mode, sleep mode), warm-up states, and related information such as, without limitation, time associated with going into a sleep mode, an idle mode, a wake-on mode, or the like, are within the scope of this disclosure. In an embodiment, the state of operation of a print device may relate to the power status of one or more components of the print device. Power status of a component of a print device information such as, without limitation, whether the component is turned off, warming-up, turned on, idle, or the like.

A "multimodal dynamic power feedback" is a visual feedback or an audio-visual feedback that provides various real-time information relating to a power status of a print device, and which includes an animation sequence and/or dynamic visual display. A multimodal dynamic power feedback may convey information using animation sequences presented through use of one or more lighting devices such as LEDs. In an embodiment, the user interface 102 may be configured to include a first light emitting module (not shown here) for providing a first visual pattern corresponding to a current power status of the print device, using a multimodal feedback mechanism. Examples may include, without limitation, a change in brightness of one or more lighting devices, one or more LEDs illuminated in a sequence or pattern (solid, blinking, blinking with different patterns and/or rates, geometrical patterns, shapes, directions of movement of illumination, etc.), one or more LEDs illuminated in one or more colors (amber, blue, green, red, etc.), intensities, or the like. In an embodiment, the multimodal dynamic feedback may also include audio feedback.

For example, a speaker may be used to provide a beeping tone or other audible output that conveys status information. Audible and visible feedbacks may be combined (e.g., by providing a status indicator tone in conjunction with a light output). A multimodal dynamic feedback may be implemented via a visual display on an associated display device.

In this document, the terms "breathing" and "breathing pattern," of a lighting device, refers to a visual pattern that includes changing the intensity of the lighting device from dim to bright and/or from bright to dim such that it mimics a breathing rhythm. A "rate of breathing" or "frequency of breathing" refers to the rate of change of intensity from dim to bright and/or from bright to dim.

FIG. 1 illustrates an example system 100 for conveying power related information using a multimodal feedback mechanism as discussed below with respect to FIG. 3. As shown in FIG. 1, a print device 101 may include a user interface 102 (such as a power button, a print button, a touch sensitive display, or the like). The user interface 102 may be located at any visible location on the surface of the print device 101.

In an embodiment, the user interface 102 may have a perimeter 104 that surrounds the user interface that includes a first light emitting module (not shown here) for providing a first visual feedback corresponding to a current power status of the print device, using a multimodal feedback mechanism. As shown in FIG. 1, perimeter 104 may include a channel, which may be a recess that forms a gap between the periphery of the user interface 102 and the body of the print device 101. Other configurations of the perimeter 104, such as a raised channel, or a bezel are within the scope of this disclosure. In an alternate embodiment, the perimeter 104 may be a part of the user interface 102 itself. Additionally and/or alternatively, the perimeter 104 may be offset from the user interface 102 and may be a part of the print device body. The first light emitting module may fully illuminate the perimeter 104, or it may be configured to illuminate only part of the perimeter 104. But the first light emitting module will not illuminate any part of the user interface other than the perimeter 104.

In an embodiment, the user interface 102 may be configured to include a second light emitting module (not shown here) for providing a second visual feedback corresponding to a current power status of the print device, using a multimodal feedback mechanism.

Figure 2:
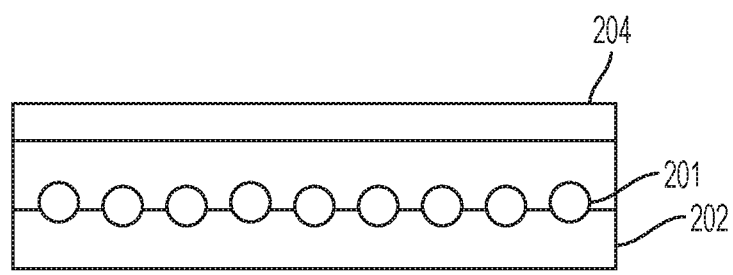
FIG. 2 illustrates an example light emitting module, according to an embodiment.

As shown in FIG. 2, a light emitting module (first and/or second) may include one or more light emission devices 201 (e.g., a light-emitting diode (LED), a light pipe, or the like) mounted on a substrate 202. The substrate 202 is a mounting substrate, and provides electrical conductors (not shown) and electrical circuits such as a printed circuit board (not shown) for electrically connecting the LEDs 201. The substrate 202 can comprise silicon, or another semiconductor material such as GaAs, SiC, GaP, GaN or AlN. Alternately, the substrate 202 can comprise a ceramic material, sapphire, glass, a printed circuit board (PCB) material, a silicone submount substrate, or any packaging substrate used in the art.

In an embodiment, a light emitting module may include a display 204 that provides a visual feedback with respect to power status of a print device. In an embodiment, the display 204 may include one or more optical components for diffusing light from the one or more LEDs. For example, an optical component may include a lens structure made from a suitable material such as, without limitation, silicone, glass, clear resin, epoxy, or the like. In an embodiment, the lens structure may include a design configured to emit light according to a desired pattern, intensity, color, etc. In an embodiment, the optical components may be configured (or designed) to project light in any desired pattern, angle, or direction for creating a dynamic feedback pattern (as discussed below).

The one or more LEDs in the light emitting module may be arranged to provide a visual pattern in the form of one or more geometrical patterns such as a line bar, a ring, a rectangle, a square, interconnected shapes, or the like. Additionally and/or alternatively, the light emitting module itself may be of the desired geometrical shape such as a line bar, a ring, a square, or the like. In an embodiment, the one or more LEDs may include LEDs of different colors or groups of LEDS comprising different colors (such as green, yellow, blue and red, among others) with each group comprising LEDs of the same colors. In an embodiment, the light emitting module may simultaneously display multiple colors. For example, the light emitting module may include a red LED and a green LED may be mounted adjacent to one another behind a lens cover. When the red LED is activated and the green LED is turned off, red light will be emitted. Green light will be emitted when the red LED is off and the green LED is on. Amber light may be produced by simultaneously activating both the green and red LEDs and/or using an amber LED.

Additionally and/or alternatively, the light emitting module may be configured to display multiple colors to convey particular information to a user (as discussed below).

In an embodiment, the light emitting module may also include other components such as a heat sink, a power supply, or the like (not shown here).

In an alternate embodiment, a light emitting module for providing a visual pattern corresponding to a power status of a print device may be included in a power indicator unit (such as an electronic device), in communication with the print device. For example, the power indicator unit may be in communication with the print device for transmitting and/or receiving data via one or more communication protocols (wired communication, wireless communications protocols such as Bluetooth, Wi-Fi, Zigbee, or the like) to and/or from a print device that is attached to or is integral with the power system.

In an embodiment, the system may also include an audio module (not shown here) for providing an audio feedback corresponding to a power status of a print device, in addition to the visual feedback. In an embodiment, the audio module may include, without limitation, a sound card, a sound chip, and other sound output circuitry that may outputs audio to a speaker, headphones, or the like.

In an embodiment, the system may include a processor and a computer-readable medium containing programming instructions that, when executed, cause the processor and/or other processing devices (such as that of a print device, the power indicator unit, or the like) to: (i) receive information relating to a power status of a print device from one or more sensors of the print device; (ii) analyze the information; and/or (iii) provide the information to a light emitting module and/or an audio module. The computer-readable medium may be a memory unit of a print device (not shown here), a memory unit of power indicator unit, or a memory of another device such as a remote system that is in communication with the print device and/or the power indicator unit.

The light emitting module may also include a control unit (not shown) in communication with a processor, for generating various control signals that affect the emission of light through the one or more LEDs. The control unit may receive information relating to a power status and/or instructions for providing a visual feedback corresponding to the power status of a print device from the processor.

In one embodiment, the LED control unit may adjust the brightness, color, illumination pattern, timing, and on/off of the one or more LEDs to create a visual display corresponding to the power status of a print device. The control unit may send and/or receive control signals to one or more LEDs via one or more communication protocols (such as I$^2$C, PWM, analog, digital, or the like). In an embodiment, the LED control unit may include ports connecting to one or more LEDs. The LED control unit may change the duty cycle of pulse width modulation (PWM) to adjust the brightness and on/off of each LED in the light emitting module. In PWM, a high-frequency signal (e.g., a square wave signal at 100 kHz) has its pulse width adjusted up or down to control the amount of power being drawn by an LED. The duty cycle is a ratio between the pulse width and the pulse period, and is represented as a percentage. Duty cycle of a PWM signal determines the average LED current flow. As the duty cycle is increased, the pulse width becomes wider while the period remains the same and an LED gets brighter. Additionally and/or optionally, the LED control unit may regulate the amount of current supplied to each of the LEDs where the intensity of the light emitted by an LED on the amount of current supplied to the LED. In an embodiment, the control unit may also adjust the color in a visual pattern by turning on/off LEDs of one or more colors. Other now or hereafter known regulation methods are within the scope of this disclosure.

Figure 3:
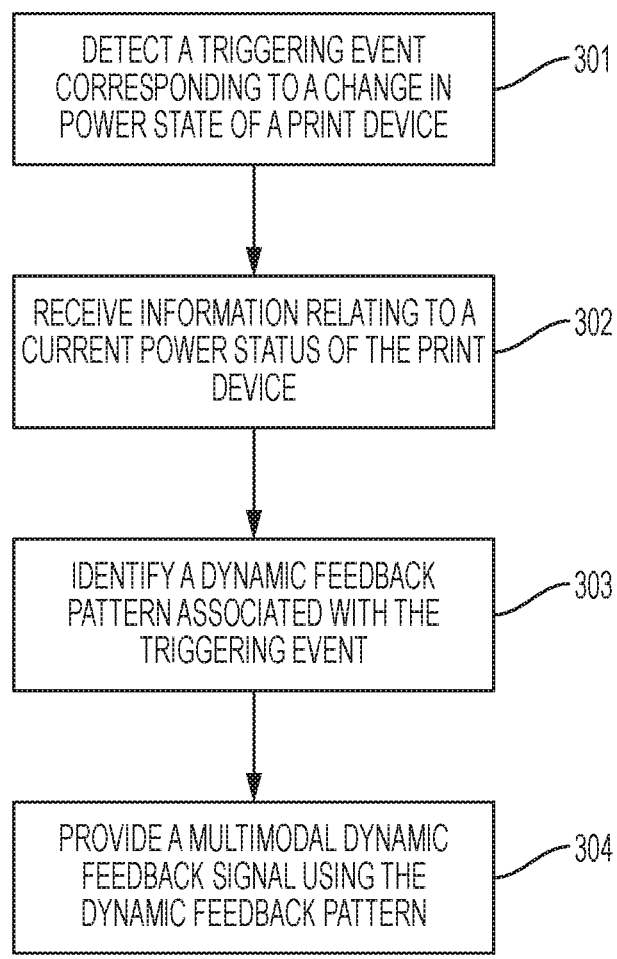
FIG. 3 is a flowchart that illustrates an example method for conveying power related information using a multimodal dynamic power feedback mechanism, according to an embodiment.

A method for conveying power related information using a multimodal feedback mechanism is further described in detail, with reference to FIG. 3. In an embodiment, the system may detect 301 a triggering event corresponding to a change in power status of a print device and/or a component of the print device. Examples of such triggering events may include, without limitation, turning on power for a print device, turning off power for a print device, impending activation of a low power mode within a determined time, activation of a low power mode such as sleep mode, activation of an idle mode, or the like.

The system may then receive 302 information relating to a power status of the print device, upon occurrence of the triggering event. In an embodiment, the information received may correspond to the triggering event. For example, the information received may correspond to the power status of one or more components of a print device during a powering on sequence, a powering off sequence, warm-up, transition to a low power mode, or the like. In an embodiment, the system may continuously receive, from one or more sensors of a print device, data relating to power status of one or more electronic components of the print device and a processor of the print device may use the data to determine a current power status of the print device. In an alternate embodiment, the system may receive data relating to one or more electronic components of the print device from one or more sensors and/or processor of a print device, and process the received information to determine the power status of the print device.

In an embodiment, the system may identify 303 a dynamic feedback pattern associated with the triggering event such as, for example, turning on/off of power, initiating warm-up for a document processing job, activation of a low-power mode, or the like. A dynamic feedback pattern refers to a sensory output (e.g., dynamic visual effect, audio-visual effect, or the like) in a particular sequence or arrangement that provides, to a user, relevant information about the power status of a print device during and/or after the triggering event. A dynamic feedback pattern may include visual patterns created using, without limitation, visual color patterns, light intensity variations, illumination patterns, illumination shapes, illumination sizes, and/or a combination thereof. A dynamic feedback pattern may also include an audio pattern. In an embodiment, the dynamic feedback pattern is automatically updated in real-time when power status of a print device and/or a component of the print device changes.

In an embodiment, a dynamic feedback pattern may convey information to the user based visual patterns created using one or more colors of light such as monochromatic lights or lights that can be adjusted to produce two, three, or more than three colors. For example, a red color may be used to indicate information relating to a powering off sequence, an amber color may be used to indicate information relating to a low power status, and a green color may be used to indicate information relating to a powering on sequence. In some embodiments, more than one color in a dynamic feedback pattern may be used to convey information about power status of one or more components of the print device.

In another example of a dynamic feedback pattern, a visual pattern may be created by varying the intensity of light emitted (e.g., from a low level to a high level, breathing, etc.). For example, a dynamic feedback pattern may include increasing the intensity of light and/or frequency of breathing to indicate the percentage of completion during a powering on sequence, percentage of completion during a powering off sequence, time remaining for warm-up of the print device, or the like (after detection of an appropriate triggering event). In another example, a dynamic feedback pattern may include increasing (or decreasing) the intensity of light and/or frequency of breathing as the time for activation of a low power mode approaches. In yet another example, a dynamic feedback pattern may include decreasing (or increasing) the intensity of light and/or frequency of breathing based on the time a print device is in a low power mode.

A dynamic feedback pattern may also convey information based on visual patterns created using different illumination patterns (solid or steady, blinking, blinking with different patterns and/or rates, increasing/decreasing in size, etc.). For example, a solid light may be used to convey information about power status of a print device when the print device is turned on/off, and/or a blinking light may be used to convey information about power status of a print device when the when a warm-up mode or a low power mode is initiated. In an embodiment, a dynamic feedback pattern may include increasing the rate of blinking of light based on the increase (or decrease) to indicate the percentage of completion during a powering on sequence, percentage of completion during a powering off sequence, time remaining for warm-up of the print device, or the like. In another example, a dynamic feedback pattern may include increasing (or decreasing) the rate of blinking as the time for activation of a low power mode approaches.

In yet another example, a dynamic feedback pattern may include visual patterns created using illumination patterns in different shapes (for e.g., by selective illumination of LEDs) such as a bar shape, a ring shape, a circle, and/or a combination thereof. Different shapes may be associated with different triggering events.

In an embodiment, a size of the illumination pattern created may be increased and/or decreased to provide more information about the power status of the print device such as for example, provide information relating to the percentage of completion of a powering on sequence and/or time remaining until completion. For example, a ring shaped illumination pattern may be used to provide information about the power status of a print device by sequentially turning on LEDs to create the ring shape, such that the illuminated arc of the ring shape increases and/or decreases in size to provide more information about the power status. In an embodiment, an increase and/or decrease in size of the illuminated arc of the ring shape may correspond to a powering on sequence where the size of the arc provides information relating to the percentage of completion of a powering on sequence and/or time remaining until completion. In an embodiment, increase and/or decrease in size of the illuminated arc of the ring shape may correspond to a powering off sequence where the size of the arc provides information relating to the percentage of completion of a powering on sequence and/or time remaining until completion.

Alternatively and/or additionally, in an embodiment, a direction of movement of an illumination pattern (such as clockwise and/or counter-clockwise in a growing ring shaped pattern, left and/or right in a growing bar shaped pattern, or the like) may be associated with different triggering events. For example, direction of movement of the illuminated arc of a ring shaped illumination pattern, i.e., increase in size of the illuminated arc in a clockwise direction may correspond to a powering on sequence, and increase in size of the illuminated arc in an counter-clockwise direction may correspond to a powering off sequence (or vice versa).

In an embodiment, a dynamic feedback pattern may also include audio patterns. For example, a speaker of an audio module may be used to provide a beeping tone or other audible output that conveys power status information. In some embodiments, the audio output may simulate a visual effect corresponding to the power status. Audible and visible status feedback output may be combined (e.g., by providing a status feedback tone in conjunction with a flashing light output). For example, the relative intensity, rate of change in the intensity, color, etc. of the light emitted by the light emitting module can be similar to the amplitude, volume, and/or frequency of the audio output from the audio module.

In an embodiment, one or more of the above visual patterns such as color patterns, intensity variations, illumination patterns, illumination shapes, and illumination sizes, and/or audio patterns may be combined in a dynamic feedback pattern to convey information about a power status of a print device. For example, a red color may be used to power status of a print device during a powering off sequence and its corresponding progress may be indicated using a blinking pattern with change in rate of blinking. Similarly, a green color may be used to indicate power status of a print device during a powering on sequence, and growing ring shape may be used to indicate corresponding power status (such as percentage of completion). The distance over which the ring is illuminated can indicate the completion status of the powering on sequence.

It should be noted that the above dynamic feedback patterns and examples are provided by way of example only and various other patterns may be used without deviating from the principles of this disclosure. Similarly, the dynamic feedback pattern examples may be used to convey information about other power statuses. In an embodiment, a user may provide some or all of rules for identifying and/or creating the dynamic feedback patterns and the associated power status.

In an embodiment, the system may use the above identified dynamic feedback pattern to provide 304 a multimodal dynamic power feedback about the power status of a print device. As discussed above, the system may include an LED control unit that may use a visual pattern in the identified dynamic feedback pattern to adjust the brightness, color, pattern, timing, and on/off of the one or more LEDs in the first light emitting module, the second light emitting module, or both, to provide a multimodal dynamic power feedback, via the visual pattern, to a user. As is known to those skilled in the art, luminance of the LED is a function of the average current flow through the LED. In an embodiment, the LED control unit may use one or more of any now or hereafter known protocols (such as PWM, I²C, etc.) to create the dynamic feedback pattern (discussed above). For example, in an embodiment, the control unit may generate illumination signals to the one or more LEDs, such that the illumination signals depend upon the dynamic feedback pattern. For example, an illumination signal delivered to an LED may include information relating to drive current, voltage, color, frequency, intensity, etc. for illumination of that particular LED.

In an embodiment, the power indicator unit may use the above identified dynamic feedback pattern to provide multimodal dynamic power feedback about the power state of a print device, by outputting the audio pattern (associated with the dynamic feedback pattern) using an audio module.

Figure 4:
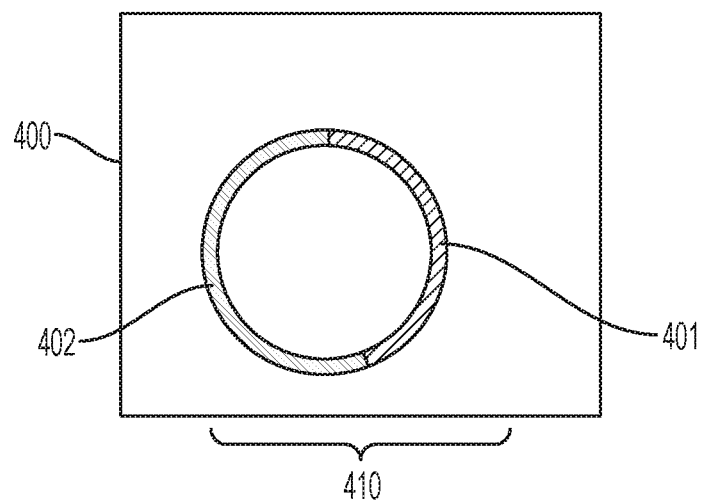
FIG. 4 illustrates an example multimodal dynamic power feedback for a powering on sequence, according to an embodiment.

In an embodiment, the system may dynamically update and/or adjust the dynamic feedback pattern for providing the multimodal dynamic power feedback, based upon information received from one or more sensors of the print device. For example, during a powering on sequence, the system may continuously receive information about the power status of one or more components of the print device and use the information to determine a percentage of completion of the powering on sequence and/or time remaining till completion. The system may then update and/or adjust the dynamic feedback pattern for providing the multimodal dynamic power feedback such that the feedback indicates percentage of completion of the powering on sequence and/or time remaining till completion in real time. FIG. 4 illustrates an example multimodal dynamic power feedback 400 during a powering on sequence. As shown in FIG. 3, at any given time, the dynamic feedback pattern 410 includes a growing ring shape illumination pattern that includes a first group of LEDs that is turned on to create an illuminated section 401 and a second group of LEDs that is turned off to create a non-illuminated section 402. The system determines the number of LEDs in the first group and the second group in real time, based on a percentage of completion of the powering on sequence and/or time remaining till completion, such that the size of sections 401 and 402 in the ring shaped dynamic feedback pattern 410 provide information relating to the percentage of completion of the powering on sequence and/or time remaining until completion. The dynamic feedback pattern of FIG. 4 may also be used to provide information about other power states of the print device, in accordance with the principles discussed above.

In another embodiment, at least part of the multimodal dynamic power feedback may be based on a rule set specifying one or more characteristics related to a power state of the print device. For example, a rule set may define the total average time for a powering on sequence of a print device and the dynamic pattern may convey the time remaining till completion of powering on sequence based on the predefined total average time. Similarly rule sets may define, total time for powering off sequence, time for warm-up of the print device (and/or a component of the print device), threshold time for a triggering event corresponding to an impending activation of a low power mode, or the like.

In an embodiment, the system may identify a first dynamic feedback pattern associated with the triggering event, for providing a first multimodal dynamic power feedback using the first light emitting module, and identify a second dynamic feedback pattern associated with the triggering event, for providing a second multimodal dynamic power feedback using the second light emitting module. The first dynamic feedback pattern may or may not be the same as the second dynamic feedback pattern.

Figure 5:
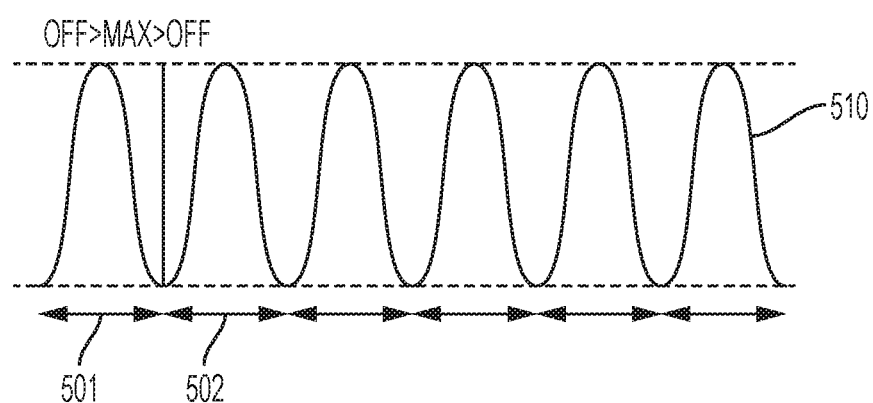
FIG. 5 illustrates an intensity versus time graph for a high rate breathing illumination pattern, according to an embodiment.
Figure 6:
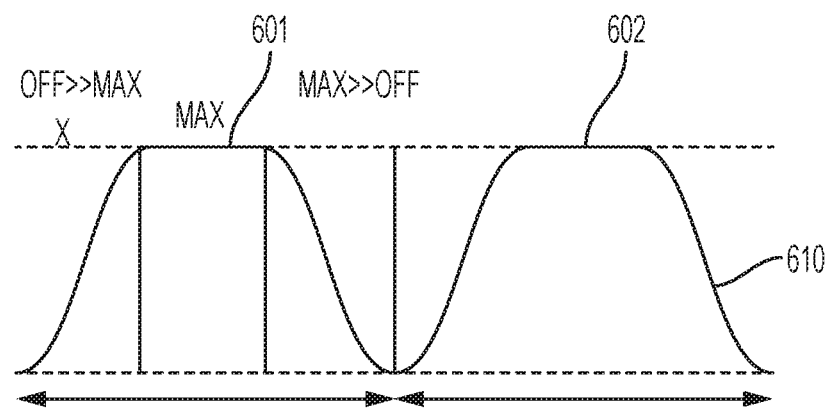
FIG. 6 illustrates an intensity versus time graph for a low rate breathing illumination pattern, according to an embodiment.
Figure 7:
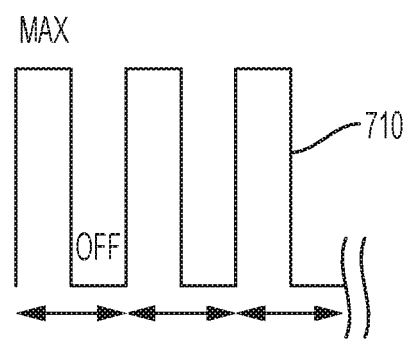
FIG. 7 illustrates an intensity versus time graph for a blinking illumination pattern, according to an embodiment.
Figure 8:
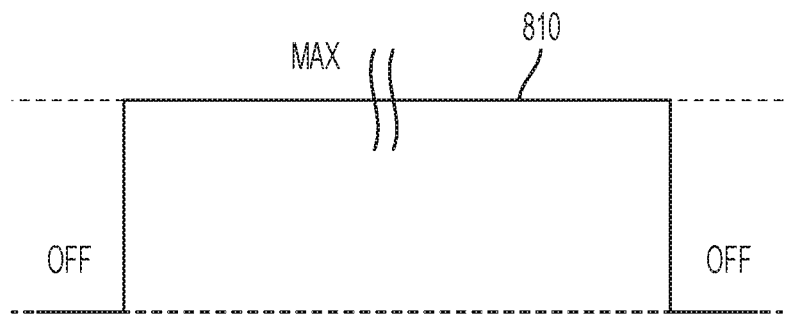
FIG. 8 illustrates an intensity versus time graph for a solid (steady) illumination pattern, according to an embodiment.
Figure 9:
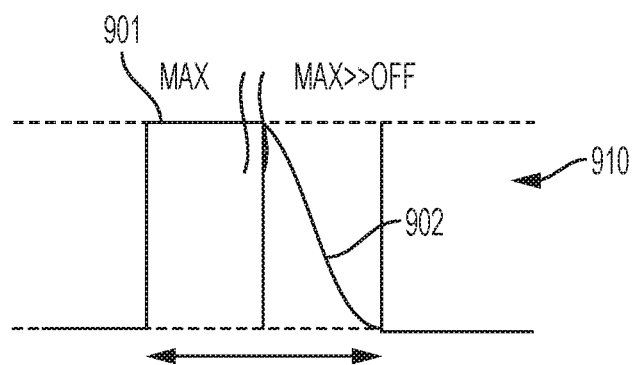
FIG. 9 illustrates an intensity versus time graph for a dynamic feedback illumination pattern, according to an embodiment.

FIGS. 5-9 illustrate example intensity (y-axis) versus time (x-axis) graphs for feedback light patterns. As shown in FIG. 5, curve 510 shows intensity versus time graph for a high rate breathing pattern. In an embodiment, a high rate breathing pattern may have a waveform shaped curve (510) with a desired frequency such that the intensity of light changes gradually from "off" to "maximum," and then gradually "off" again in a desired time period (section 501, 502, and so on). Off may correspond to zero intensity. Maximum may correspond to any non-zero intensity of light and a pattern may include one or more different maximum values. Examples of the time period may be 1 second, 1.5 seconds, 2 seconds, 5 seconds, 10 seconds, or the like. Sections 501, 502, etc. may or may not have the same amplitude and/or frequency. Curve 610 in FIG. 6 shows intensity versus time graph for a low rate breathing pattern. A low rate breathing pattern is different from a high rate breathing pattern in that the intensity of light stays at "maximum" for a perceptible amount of time (601, 602). Hence, in a high rate breathing pattern the intensity of light changes gradually from "off" to "maximum," stays "maximum" for some time, and then changes gradually from "maximum" to "off." Curve 710 in FIG. 7 shows intensity versus time graph for a blinking pattern. A blinking pattern is different from a breathing pattern in that, as shown in FIG. 7, the intensity is instantaneously (or almost instantaneously) changes from "off" to "maximum," or vice versa in a desired time period. Examples of the time period may be 1 second, 1.5 seconds, 2 seconds, 5 seconds, 10 second, or the like. FIG. 8 shows intensity versus time graph for a solid color pattern (810), and the light intensity stays steady at "maximum" (i.e., a non-zero intensity). Finally, FIG. 9 shows an intensity versus time graph (910) for a dynamic feedback pattern that includes a change in intensity from steady solid at a non-zero intensity (901) to a gradual breathing "off" (902).

Figure 10:
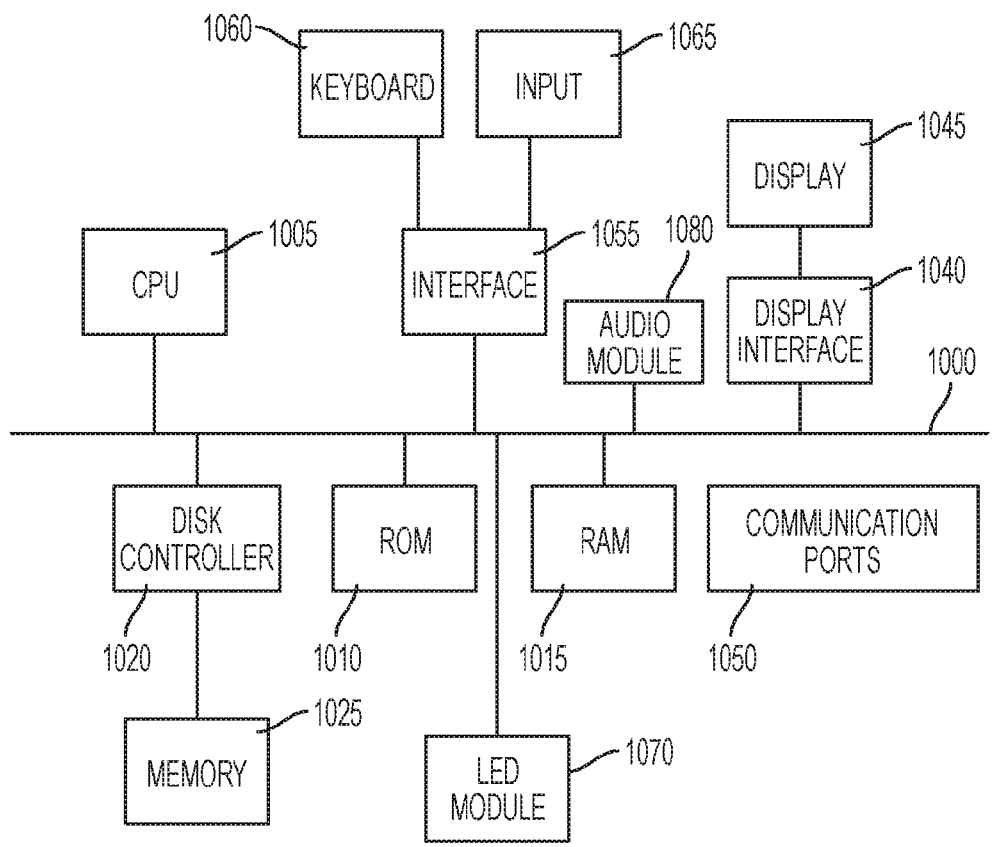
FIG. 10 depicts various embodiments of one or more electronic devices for implementing the various methods and processes described herein.

FIG. 10 depicts an example of internal hardware that may be included in any of the electronic components of the system, the system, the print device, or another device in the system. An electrical bus 1000 serves as an information highway interconnecting the other illustrated components of the hardware. Processor 1005 is a central processing device of the system, configured to perform calculations and logic operations required to execute programming instructions. As used in this document and in the claims, the terms "processor" and "processing device" may refer to a single processor or any number of processors in a set of processors Read only memory (ROM) 1010 and random access memory (RAM) 1015 constitute examples of memory devices or processor-readable storage media.

A controller 1020 interfaces with one or more optional tangible, computer-readable memory devices 1025 to the system bus 1000. These memory devices 1025 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1010 and/or the RAM 1015. Optionally, the program instructions may be stored on a tangible computer readable medium 1025 such as a compact disk, a digital disk, flash memory, a memory card, a USB drive, an optical disc storage medium, such as a Blu-Ray™ disc, and/or other recording medium controlled via a disk controller 1020.

An optional display interface 1040 may permit information from the bus 1000 to be displayed on a display device 1045 in visual, graphic or alphanumeric format. A light emitting module 1070 may include one or more LEDs and associated circuitry for generating various light effects by affecting the emission of light through the LED. An audio interface and audio output (such as a speaker) also may be provided. An audio module 1080 may include a sound card, a sound chip, and other sound output circuitry that outputs audio to a speaker, headphones, or the like.

Communication with external devices such as a printing device, may occur using various communication devices 1050 such as a transmitter and/or receiver, antenna, an RFID tag and/or short-range or near-field communication circuitry. A communication device 1050 may be attached to a communications network, such as the Internet, a local area network or a cellular telephone data network.

The hardware may also include a user interface 1055 that allows for receipt of data from input devices 1060 such as a keyboard, a mouse, a joystick, a touchscreen, a remote control, a pointing device, a video input device (camera) and/or an audio input device (microphone). Various sensors (not shown here) such as a proximity sensor, may be included to detect user proximity.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A multifunction device comprising:
   a print engine;
   one or more power status monitors;
   a user interface, wherein the user interface is at least partially surrounded by a perimeter;
   a first light emitting module positioned to illuminate at least part of the perimeter;
   a processor in communication with the first light emitting module; and
   a computer-readable medium containing programming instructions that are configured to, when executed by the processor, cause the processor to:
     detect a triggering event corresponding to a power on of the multifunction device,
     in response to detecting the triggering event, receive, from the one or more power status monitors, information relating to a current power status of the multifunction device, wherein information relating to the current power status of the multifunction device comprises information relating to a current power status of one or more components of the multifunction device, determine a time remaining until completion of a powering on sequence of the multifunction device, identify a dynamic feedback pattern associated with the triggering event, wherein the dynamic feedback pattern comprises a first visual pattern corresponding to a growing ring shape illumination pattern that provides information about the current power status corresponding to the powering on sequence to a user, and wherein a size of the growing ring shape illumination pattern is determined based on the determined time remaining until completion of the powering on sequence, and instruct the first light emitting module to emit the first visual pattern.

2. The multifunction device of claim 1, wherein the first light emitting module comprises:

a display comprising an LED;

a control unit, wherein the control unit is configured to:
receive the dynamic feedback pattern from the processor, and
generate commands to cause the LED to create the first visual pattern.

3. The multifunction device of claim 1, wherein:

the multifunction device further comprises an audio module; and the computer-readable medium comprises additional programming instructions that are configured to, when executed by the processor, cause the processor to:
identify the dynamic feedback pattern so that the dynamic feedback pattern also comprises at least one audio pattern,
instruct the audio module to output the audio pattern as the first light emitting module emits the first visual pattern.

4. The multifunction device of claim 3, wherein the instructions that cause the audio module to output the audio pattern are configured to cause the audio pattern to simulate the first visual pattern.

5. The multifunction device of claim 1, wherein:

the user interface also comprises a second light emitting module; and the identified dynamic feedback pattern also comprises a second visual pattern that will be emitted by the second light emitting module.

6. The multifunction device of claim 1, wherein:

the programming instructions that are configured to cause the processor to detect the triggering event comprise programming instructions that are configured to cause the processor to further detect one or more of the following:
power off of the multifunction device,
activation of a low power mode,
impending activation of a low power mode within a threshold time period, or
activation of warm-up of the multifunction device; and the dynamic feedback pattern further comprises one or more distinct first visual patterns corresponding to: a powering off sequence of the multifunction device, a warm up sequence of the multifunction device, or a low power status of the multifunction device.

7. The multifunction device of claim 1, wherein the first visual pattern comprises one or more of the following: LED color patterns, LED intensity variations, LED illumination patterns, LED illumination shapes, or LED illumination sizes.

8. The multifunction device of claim 1, wherein:

the user interface is a power button; and the perimeter comprises a channel or a bezel.

9. A method for providing a multimodal dynamic power feedback for a multifunction device comprising:

detecting a triggering event corresponding to a power on of the multifunction device;

in response to detecting the triggering event, receiving, from one or more power status monitors of the multifunction device, information relating to a current power status of the multifunction device, wherein information relating to the current power status of the multifunction device comprises information relating to a current power status of one or more components of the multifunction device;

determining a time remaining until completion of a powering on sequence of the multifunction device;

identifying a dynamic feedback pattern associated with the triggering event, wherein the dynamic feedback pattern comprises a first visual pattern comprising a growing ring shape illumination pattern that provides information about the current power status corresponding to the powering on sequence to a user, and wherein a size of the growing ring shape illumination pattern is determined based on the determined time remaining until completion of the powering on sequence; and instructing a first light emitting module to emit the first visual pattern, wherein the first light emitting module is positioned to illuminate at least part of a perimeter that at least partially surrounds a user interface of the multifunction device.

10. The method of claim 9, wherein:

the first light emitting module comprises:
an LED, and
a control unit; and instructing the first light emitting module to emit the first visual pattern comprises instructing the control unit to generate commands to cause the LED to create the first visual pattern.

11. The method of claim 9, further comprising:

identifying the dynamic feedback pattern so that the identified dynamic feedback pattern also comprises an audio pattern; and instructing an audio module to output the audio pattern as the first light emitting module emits the first visual pattern.

12. The method of claim 11, wherein instructing the audio module to output the audio pattern comprises instructing the audio module to cause the audio pattern to simulate the first visual pattern.

13. The method of claim 9, further comprising:

identifying the dynamic feedback pattern so that the identified dynamic feedback pattern also comprises a second visual pattern; and instructing a second light emitting module to emit the second visual pattern, wherein the second light emitting module illuminates the user interface.

14. The method of claim 9, wherein:

detecting the triggering event further comprises detecting one or more of the following:
power off of the multifunction device,
activation of a low power mode,
impending activation of a low power mode within a threshold time period, or
activation of warm-up of the multifunction device; and the identified dynamic feedback pattern further comprises one or more distinct first visual patterns corresponding to: a powering off sequence of the multifunction device, a warm up sequence of the multifunction device, or a low power status of the multifunction device.

15. The method of claim 9, wherein the first visual pattern comprises one or more of the following: LED color patterns, LED intensity variations, LED illumination patterns, LED illumination shapes, or LED illumination sizes.

* * * * *